United States Patent [19]

Nahill et al.

[11] Patent Number: 4,936,473
[45] Date of Patent: Jun. 26, 1990

[54] HOT-FILL PRODUCT CONTAINER WITH MULTI-LAYER WALL STRUCTURE

[75] Inventors: Thomas E. Nahill, Amherst; Suppayan M. Kirishnakumar, Nashua, both of N.H.

[73] Assignee: Continental PET Technologies, Inc., Norwalk, Conn.

[21] Appl. No.: 245,375

[22] Filed: Sep. 16, 1988

[51] Int. Cl.⁵ .............................................. B65D 23/00
[52] U.S. Cl. .................................. 215/12.2; 215/1 C; 428/36.6; 428/36.7
[58] Field of Search ........................ 215/1 C, 12.1, 12.2; 53/452; 428/36.6, 36.7

[56] References Cited

U.S. PATENT DOCUMENTS

| | | | |
|---|---|---|---|
| 4,392,576 | 7/1983 | Berger et al. | 215/12.2 |
| 4,393,106 | 7/1983 | Maruhashi et al. | 215/1 C X |
| 4,550,043 | 10/1985 | Beck | 215/1 C |
| 4,609,516 | 9/1986 | Krishnakumar et al. | 264/513 X |
| 4,610,366 | 9/1986 | Estes et al. | 215/1 C |
| 4,665,682 | 5/1987 | Kerins et al. | 53/452 |
| 4,728,549 | 3/1988 | Shimizu et al. | 215/1 C |
| 4,764,403 | 8/1988 | Ajmera | 215/1 C X |

*Primary Examiner*—Sue A. Weaver
*Attorney, Agent, or Firm*—Charles E. Brown; Paul Shapiro; Charles A. Brown

[57] ABSTRACT

This relates to a container, particularly adapted for receiving a hot-fill product. Most particularly, the container is a blow molded plastic container with the principal plastic material being a polyester resin. Critical areas of the container have walls of a laminated construction with preferably at least five layers of which two layers is a moisture barrier layer. The polyester resin primarily utilized, PET, is very sensitive to moisture pickup and by utilizing the moisture barrier layers, the moisture pickup of the primary resin may be reduced with a resultant reduction in the shrinkage and distortion of such container when hot filled.

3 Claims, 1 Drawing Sheet

HOT-FILL PRODUCT CONTAINER WITH MULTI-LAYER WALL STRUCTURE

This invention relates in general to new and useful improvements in blow molded containers which are formed from preforms and wherein such containers have at least the body thereof of a laminated wall construction. Most particularly, this invention relates to a multi-layer container which is especially adapted for receiving a hot-fill product with the layers of the container including moisture barrier layers whereby the moisture absorption of a core layer is held to a minimum.

More particularly, this invention relates to a container which is formed primarily of a polyester which is very sensitive to moisture pickup and wherein as the moisture content of the polyester increases, the glass transition temperature of the polyester decreases. When a blow molded plastic container is utilized in conjunction with the hot-fill product, it is desirable that the glass transition temperature (Tg) be maintained at a high level so as to resist shrinkage and distortion.

The invention particularly relates to a multi-layer container having at least five layers. Such containers are broadly known where there is an inner and outer layer, a core layer, and intermediate gas barrier layer. The patent to Krishnakumar et al 4,609,516 granted Sept. 2, 1986 discloses such a container construction and the manner forming the same. This invention in particular relates to substituting for the gas barrier layers of the Krishnakumar et al patent moisture barrier layers to form a modified container which is particularly adapted for use in conjunction with hot-fill products.

Other patents similar to the Krishnakumar et al patent are Beck 4,550,043 granted Oct. 29, 1985 and Shimizu et al 4,728,549 granted Mar. 1, 1988.

With the above and other objects in view that will hereinafter appear, the nature of the invention will be more clearly understood by reference to the following detailed description, the appended claims, and the several views illustrated in the accompanying drawings.

Figures 1, 2:
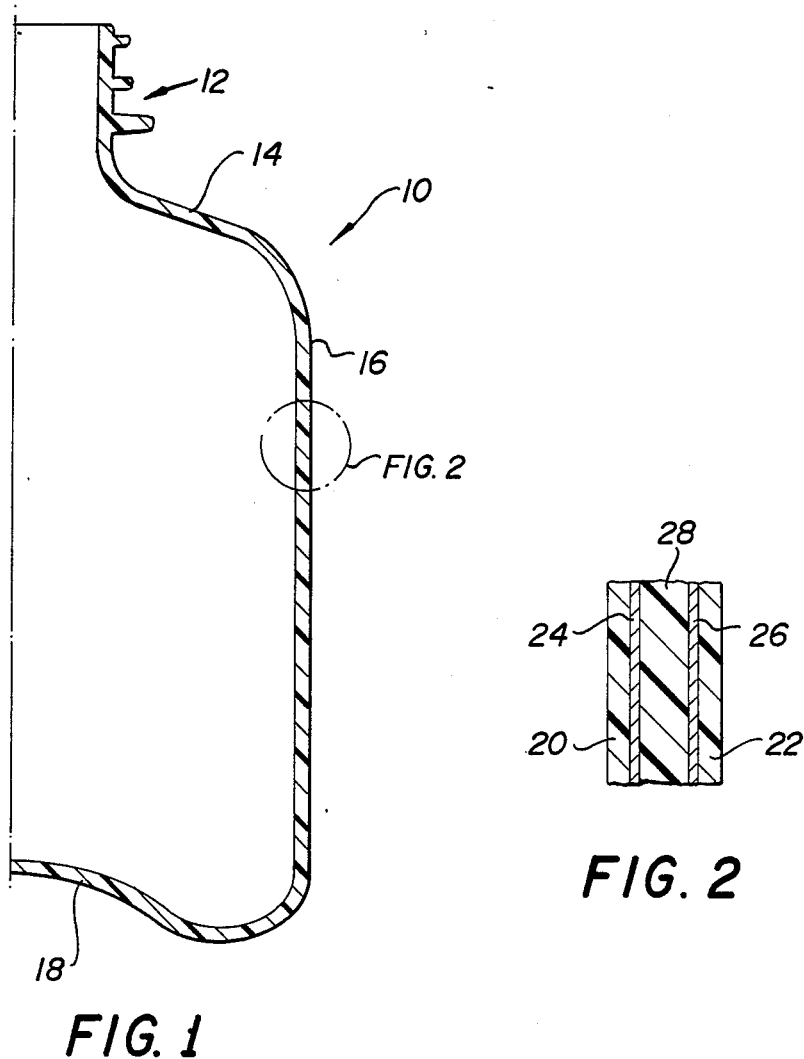
FIG. 1 is a schematic half sectional view taken through a container formed in accordance with this invention.
FIG. 2 is an enlargement taken through the body portion of the container and shows the five layer construction thereof.

Referring now to the drawings in detail, it will be seen that there is illustrated in FIG. 1 a conventional container 10 which is formed in accordance with this invention. The container 10 includes a neck finish 12, a shoulder portion 14, a cylindrical body portion 16 and a bottom or base 18.

First of all, it is to be understood that the bottom or base 18 may vary depending upon the intended usage of the container. The illustrated bottom or base 18 is of the "champagne" type.

In accordance with this invention and is specifically disclosed in the above-identified Krishnakumar et al patent, the container 10 is formed by blow molding a preform in a blow mold in a conventional manner. The preform (not shown) is formed in an injection mold cavity by means of an injection molding process as also disclosed in the Krishnakumar et al patent. The injection molding process permits the formation of at least the body portion 16 having an inner layer 20 and an outer layer 22, an inner barrier layer 24 and an outer barrier layer 26, and a core 28. The barrier layers 24 and 26 are most specifically moisture barrier layers as opposed to being gas barrier layers.

As is specifically disclosed in the Krishnakumar et al patent, the layers 20 and 22 will be of substantially the same wall thickness while the barrier layers 24 and 26 will be quite thin and substantially of the same wall thickness. Also, it is to be understood from the disclosure of the Krishnakumar et al patent that the barrier layers 24, 26 may be in any specifically designated portion of the container 10 although preferably the barrier layers 24, 26 will exist only in the shoulder portion 14, the body portion 16 and thin portions of the base 18.

In a conventional half liter container, particularly one wherein the polyester resin is polyethylene terephythalate (PET), the layers 20, 22 will have a thickness on the order of 2–4 mils while the core layer 28 will have a thickness on the order of 4–6 mils. The water barrier layers 24, 26 will have a thickness on the order of 0.1–0.8 mils. The total wall thickness of the container 10 will be on the order of 9–12 mils.

It is to be particularly understood that PET, being a condensation polymer, is very sensitive to moisture pickup and the resulting Tg reduction. It is further to be understood that when the Tg of the principal polymer of a container is reduced, the resistance of such container to distortion and shrinkage at high temperatures, such as those involved when the container is filled with a hot-fill product, will be undesirable. Therefore, it is essential, in accordance with this invention, that the moisture pickup of the polyester resin layers be restricted as much as possible. It is for this reason that the barrier layers 24, 26, must have greater barrier properties with respect to liquids, particularly water.

At the present, the preferred materials for the moisture barrier layers are a moisture barrier polymer such as SARAN (PVDC) or suitable olefins. Inasmuch as the total volume of the moisture barrier layers 24, 26 constitutes only on the order of 6% of the total volume of the plastic materials forming the container 10, it will be seen that it is feasible to utilize highly effective, yet somewhat expensive, moisture barrier materials.

It is to be understood that the moisture vapor transmittal rate of oriented PET is very high as compared to other resins. The moisture barrier transmittal rate of oriented PET at 40° C., 90% relative humidity over a period of 24 hours in terms of gm/mil/100 in$^2$ is 1.2 as compared to 0.1–0.2 for PVDC, 0.4 for high density polyethylene and 0.7 for polypropylene.

PET containers having the layer thicknesses set forth above with the water barrier being PVDC and tested with the interior of the container at 100% relative humidity and the exterior of such container at an ambient relative humidity on the order of 30%, after 30 days at 75° F., the percentages of water in the various PET layers were 0.30 in the inner layer 20, 0.06 in the core layer 28 and 0.15 in the outer layer 22. Such a container construction has shrinkage and distortion limits within those required for a hot-fill product carrier wherein the product is placed in the container at a temperature on the order of 90° C.

Comparative data for a half liter container formed solely of PET as opposed to a five layer container formed of PET and PVDC at the ratio of 94/6 in terms of percent shrinkage at 90° C. is as follows:

| PPM (%) | Percent Shrinkage | |
| --- | --- | --- |
| MOISTURE | MONO | MULTI |
| 200 (0.02) | 0.2 | 0.2 |
| 500 (0.05) | 1.0 | 0.6 |
| 1000 (0.10) | 2.5 | 1.5 |
| 3000 (0.30) | 5.0 | 2.0 |
| 5000 (0.50) | >10 | 2.5 |

Note:
200 is very dry, 5000 is saturation @ 80° F., 80% RH.

More specifically, the percent shrinkage of the laminated wall container is on the order of one-quarter of that of a single layer wall formed of the same polyester stored @ 30° relative humidity @ 23° C. where the container is filled with a liquid at 85°–90° C. for thirty days.

From the foregoing, it will be seen that by utilizing a small percentage (6%) of a more expensive moisture barrier material, the shrinkage percentage of a container may be greatly reduced with the ratio increasing as the relative humidity of the environment increases.

Although only a preferred embodiment of the container has been specifically illustrated and described, it is to be understood that minor variations may be made in the container construction without departing from the spirit and scope of the invention as defined by the appended claims.

We claim:

1. A container comprising a blow molded plastic container specifically intended to form a container for a hot fill liquid and having a construction capacity for receiving a hot fill liquid, said container having at least a body portion thereof of a laminated wall construction, said laminated wall being formed of at least five layers including inner and outer layers and a central core formed of condensation polyester sensitive to moisture pick-up and a resultant graduation, and two intermediate moisture barrier polymer layer means for specifically restricting moisture pick-up in said polyester core, said barrier layer means constitutes on the order of only 6% of the total plastic of said container.

2. A container according to claim 1 wherein the moisture content increases of said core is on the order of 0.06% after thirty days at 75° F. when the container is filled with a liquid and surrounding air has an ambient relative humidity on the order of 30% (average).

3. The container of claim 1 wherein the percent shrinkage of the laminated wall container is on the order of one quarter of that of a single layer wall formed of the same polyester stored @ 30% relative humidity @ 23° C. when the container is filled with a liquid at 85°–90° C. for 30 days.

* * * * *